US012631266B2

(12) United States Patent
Willers et al.

(10) Patent No.: US 12,631,266 B2
(45) Date of Patent: May 19, 2026

(54) VALVE FOR CONTROLLING A MEDIUM IN A COOLING CIRCUIT OR HEAT CIRCUIT

(71) Applicant: OTTO EGELHOF GmbH & Co. KG, Fellbach (DE)

(72) Inventors: Eike Willers, Stuttgart (DE); Juergen Sohn, Esslingen (DE); Kryszstof Kurowski, Waiblingen (DE)

(73) Assignee: OTTO EGELHOF GMBH & CO. KG, Fellbach (DE)

( * ) Notice: Subject to any disclaimer, the term of this patent is extended or adjusted under 35 U.S.C. 154(b) by 65 days.

(21) Appl. No.: 18/137,284

(22) Filed: Apr. 20, 2023

(65) Prior Publication Data
US 2023/0375105 A1     Nov. 23, 2023

(30) Foreign Application Priority Data
Apr. 21, 2022     (DE) .......................... 102022109609.2

(51) Int. Cl.
*F16K 35/02*          (2006.01)
*F16K 1/32*          (2006.01)
(Continued)

(52) U.S. Cl.
CPC ................ *F16K 35/02* (2013.01); *F16K 1/32* (2013.01); *F16K 1/36* (2013.01); *F16K 1/38* (2013.01);
(Continued)

(58) Field of Classification Search
CPC .......... F16K 35/02; F16K 1/36; F16K 27/029; F16K 1/52; F16K 1/38; F16K 15/063;
(Continued)

(56) References Cited

U.S. PATENT DOCUMENTS 2,629,580 A * 2/1953 Schultis ................... F16K 1/02
                                                    137/454.6
5,018,552 A   5/1991 Politi et al.
(Continued)

FOREIGN PATENT DOCUMENTS

DE          4116188 A1    11/1991
EP          3280934 B1     8/2020
WO      2014202369 A1    12/2014

*Primary Examiner* — Craig M Schneider
*Assistant Examiner* — Christopher D Ballman
(74) *Attorney, Agent, or Firm* — KRIEGSMAN & KRIEGSMAN

(57) ABSTRACT

A valve with a housing has a connection point for insertion into a connection device and a valve seat associated with a passage opening, which valve seat can be closed by a valve closing member, and is transferable by a drive or a pressure of a medium to an operating position in which the valve closing member is lifted with respect to the valve, having a securing element, which holds the valve closing member in a filling position relative to the valve seat, in which position the valve closing member is lifted with respect to the valve seat and unblocks the passage opening, and the securing element can be transferred, following the first transfer of the valve closing member from the filling position to the operating position, to a disengaged position relative to the valve closing member and subsequently the valve closing member is transferable to the closed position.

17 Claims, 7 Drawing Sheets

Figure 1:
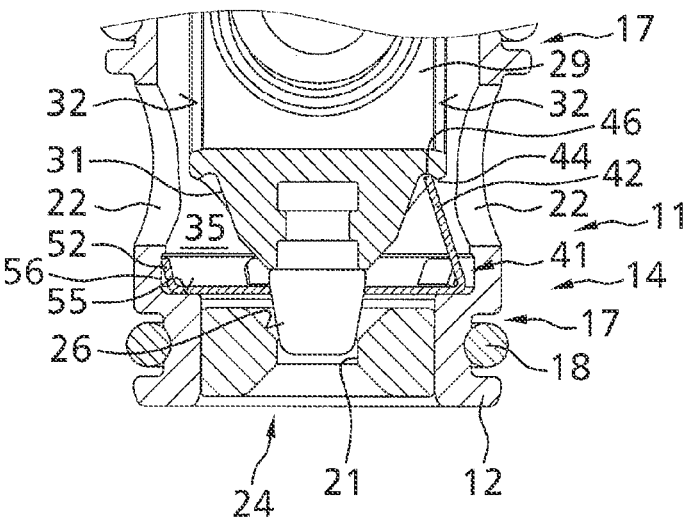

(51) Int. Cl.

| | |
|---|---|
| *F16K 1/36* | (2006.01) |
| *F16K 1/38* | (2006.01) |
| *F16K 1/52* | (2006.01) |
| *F16K 15/02* | (2006.01) |
| *F16K 15/06* | (2006.01) |
| *F16K 17/40* | (2006.01) |
| *F16K 27/02* | (2006.01) |
| *F16K 31/02* | (2006.01) |
| *F16K 35/00* | (2006.01) |

(52) U.S. Cl.
CPC ................ *F16K 1/52* (2013.01); *F16K 15/02* (2013.01); *F16K 15/063* (2013.01); *F16K 17/406* (2013.01); *F16K 27/029* (2013.01); *F16K 31/025* (2013.01); *F16K 35/00* (2013.01)

(58) Field of Classification Search
CPC ...... F16K 17/406; F16K 35/00; F16K 31/025; F16K 1/32; F16K 15/02; F16K 31/002; B60K 2001/005; B60K 11/02; F25B 41/20
See application file for complete search history.

(56) References Cited

U.S. PATENT DOCUMENTS

| | | | | |
|---|---|---|---|---|
| 5,144,973 | A * | 9/1992 | Green | F17C 13/12 137/71 |
| 6,084,493 | A * | 7/2000 | Siegel | F16K 31/0665 335/278 |
| 6,340,031 | B1 * | 1/2002 | Matsumoto | F16K 15/063 137/542 |
| 6,427,972 | B1 * | 8/2002 | Kirschner | B60T 8/363 251/129.15 |
| 6,627,077 | B2 * | 9/2003 | Fritsch | F15B 13/044 137/550 |
| 6,637,724 | B1 * | 10/2003 | Mayer | B60T 15/028 251/129.01 |
| 6,783,337 | B2 * | 8/2004 | Nelson | F04B 53/1022 417/570 |
| 6,945,510 | B2 * | 9/2005 | Dralyuk | F16K 27/029 137/15.17 |
| 7,954,511 | B2 * | 6/2011 | Kohlberger | F16K 39/024 137/614.17 |
| 8,123,193 | B2 * | 2/2012 | Kratzer | F16K 31/0658 137/15.17 |
| 8,375,973 | B2 * | 2/2013 | Barnish | F16K 31/0648 137/15.18 |
| 8,500,086 | B2 * | 8/2013 | Kratzer | B60T 8/363 303/119.2 |
| 8,882,078 | B2 * | 11/2014 | Yamada | F16K 1/38 251/324 |
| 10,072,760 | B2 * | 9/2018 | Kajio | F16K 1/42 |
| 10,480,662 | B2 * | 11/2019 | Futahashi | F16K 47/02 |
| 10,851,927 | B2 * | 12/2020 | Stachowiak | F16K 35/022 |
| 10,890,270 | B2 * | 1/2021 | Kurz | F16K 31/0665 |
| 10,927,975 | B2 * | 2/2021 | Kurz | F16K 31/0675 |
| 10,941,865 | B2 * | 3/2021 | Hata | F16K 1/32 |
| 11,287,167 | B2 * | 3/2022 | Tang | F16K 31/50 |
| 11,608,901 | B2 * | 3/2023 | Willers | F16K 1/36 |
| 2003/0150486 | A1 | 8/2003 | Liebert | |
| 2006/0278280 | A1 * | 12/2006 | Yang | F16K 27/0209 137/542 |

* cited by examiner 18
54
41
14
18
27
22
42
12
24

54
41
52
53
42

1

VALVE FOR CONTROLLING A MEDIUM IN A COOLING CIRCUIT OR HEAT CIRCUIT

This application claims priority of German Application No. 10 2022 109 609.2 filed Apr. 21, 2022, which is hereby incorporated herein by reference in its entirety.

The invention relates to a valve, in particular for controlling a medium in a cooling circuit or a heat circuit.

WO 2014/202369 A1 discloses a switch valve, which is configured for insertion into a connection point in a connection device. This connection device can be a so-called chiller in a refrigerant circuit. The connection point of the switch valve comprises a passage opening, which connects a supply opening and an outlet opening to one another in a housing of the connection point. To open and close the passage opening, a valve closing member is provided, which can be arranged in a closed position in a valve seat enclosing the passage opening. An opening movement of the valve closing member into an operating position is actuated by a drive. The drive comprises an actuating element made of a shape memory alloy, due to which element the valve closing member can be transferred from the closed position to an open position. Furthermore, the drive comprises a return element, which acts counter to the actuating movement of the actuating element and transfers the valve closing member to the closed position. This switch valve is what is called a Normally Closed Valve.

On electric vehicles, it is necessary for the battery to be cooled during operation and/or during a charging process by a refrigeration circuit. To control this refrigeration circuit, at least one valve is used. To fill the refrigeration circuit with a medium, it is necessary that the valve is provided in manner to be open, as at the time of filling the cooling circuit, an infrastructure for actuating the valve into an open position is not available or is undesirable for safety reasons.

The object underlying the invention is to propose a valve that is delivered open for a filling process of a cooling circuit or heat circuit and is supplied for installation in the cooling circuit or heat circuit and is operational following filling.

This object is achieved by a valve on which a securing element is provided, which holds the valve closing member in a filling position relative to the valve seat, and on which the securing element, following the first transfer of the valve closing member to the operating position, can be transferred to a disengaged position relative to the valve closing member and subsequently the valve closing member is transferable to the closed position. Due to this securing element, the valve closing member can be supplied in an open position, namely in the filling position, and fitted in the refrigeration circuit. Through the first actuation of the valve, thus the transfer to an operating position during filling of the circuit with medium or by actuation of a drive, the securing element disengages itself autonomously from the valve closing member and transitions to the disengaged position, so that the valve operates and can be actuated as intended. Due to the arrangement of the securing element, it is thus made possible that a filling process of the refrigeration circuit is enabled directly following installation of the valve and the filling position is unlocked and the valve closing member is enabled for operation without additional actions or manipulation.

The filling position of the valve closing member is preferably located between the closed position and the operating position, in which the valve is open. During filling of the circuit or by activation of a drive, the valve closing member is transferred from the filling position to the operating position. The one-time filling position of the valve closing member is cancelled thereby.

It is preferably provided that the securing element is arranged in the regulating chamber in the housing of the valve. This has the advantage that damage to or unintended unlocking of the securing element does not occur during delivery and fitting. In individual applications it can also be provided, if the connection point of the connection device permits this, that the securing element engages on the outer circumference of the connection point on the housing of the valve and can be inserted together with the connection point into the connection device.

The securing element preferably has a securing lug or securing pin, which is arranged under pre-tensioning in the filling position relative to the valve closing member. This has the advantage on the one hand that the filling position can be maintained in a secure manner even with respect to vibrations during transportation or fitting. On the other hand, it is facilitated by this that following transfer of the valve closing member from the filling position to the operating position, the securing lug or the securing pin disengages itself autonomously from the filling position and can be transferred to the disengaged position when viewed relative to the valve closing member.

Furthermore, it is preferably provided that the securing lug or securing pin of the securing element is transferable from the filling position to the disengaged position by a pivot movement or rotary movement or by a radial movement outwards with respect to a longitudinal axis of the valve closing member. The valve closing member can thereby continue to be capable of actuation between the closed position and the operating position in a simple manner by a lifting movement.

To maintain the filling position of the securing lug or securing pin, a releasable latch connection or a releasable clamp connection is provided between the securing element and the valve closing member. In particular, an undercut is provided on the valve closing member on which the securing lug or the securing pin engages. This undercut can be provided as a circumferential groove on the valve closing member. This circumferential groove can lie in a conical region of the valve closing member, so that guide sections of the valve closing member, by which the valve closing member is guided in the regulating chamber so as to be movable up and down, are not adversely affected.

According to a preferred embodiment, the securing element has an annular basic body, which is configured to be open or closed, wherein on the annular basic body the securing lug or the securing pin is angled with respect to a planar extension of the basic body. This permits a simple geometry of the securing element and positioning of the valve closing member in the filling position.

Provided advantageously on the annular basic body of the securing element are latching elements, which act on or engage in the connection point and secure the securing element in an installation position relative to the connection point. These latching elements can be elements which connect in a latching manner to a recess or opening in the regulating chamber or on an outside of the connection point by placing on or sliding on or by insertion.

It is advantageously provided that at least one latching element is configured as a latching lug projecting radially outwards on the annular basic body, which latching lug engages in a recess in the housing, in particular in the regulating chamber, and secures the securing element in the regulating chamber in the installation position. This configuration of the at least one latching element also enables simple fitting.

The annular basic body has in particular an opening that aligns with the passage opening. In particular, the annular basic body circumferentially adjoins the valve seat externally. The securing element can thus be provided in the regulating chamber in a manner that promotes flow.

According to another preferred configuration of the latching element, it is provided that the at least one latching element acts on or engages in an entry opening or outlet opening in the connection point of the housing. Additional fixing of the securing element relative to the housing can be achieved thereby.

Furthermore, it is preferably provided that the securing element with the securing lug or securing pin is oriented to a supply opening or an outlet opening and is arranged in the regulating chamber. This association of the securing lug or the securing pin with the supply opening or the outlet opening makes it possible for the securing lug or securing pin to be transferable in a simple manner to the filling position using a tool and for the valve closing member to latch subsequently with the securing element.

According to a preferred embodiment of the valve, the securing element is formed of metal, in particular spring steel. This has the advantage that the pretensioning can be maintained even in the case of a very long storage time in which the securing lug or the securing pin is held in the filling position. Alternatively, it can also be provided that the securing element is formed of plastic. Furthermore, the securing element can be formed as a composite component from metal and plastic, preferably as a metal element coated with plastic.

The metal securing element is advantageously configured as a bent stamped part. The securing element formed of plastic can be manufacturable as an injection-moulded part.

According to a preferred application, the valve can be configured as a nonreturn valve, in which the valve closing member is arranged in the closed position by a return element. Due to the operating pressure during filling of the refrigeration circuit, the valve closing member can be transferable to the operating position, whereby unlatching of the filling position takes place autonomously, so that at the end of the filling process, automatic or autonomous closing of the valve is achieved.

It can be provided alternatively that the valve is configured as a switch valve with a drive, which is connectable on or in the housing and by which the valve closing member can be actuated for opening and closing the passage opening, wherein the drive comprises an actuating element made of a shape memory alloy, by which the valve closing member is transferable when actuated by the drive from a closed position to an operating position, in which the valve closing member is lifted with respect to the valve seat and wherein the drive comprises a return element, which counteracts the actuating movement of the actuating element and transfers the valve closing member to the closed position relative to the valve seat and holds it in the closed position in the event of non-actuation of the drive. With switch valves of this kind, the advantage is achieved that without energisation of the drive, filling of the cooling circuit is enabled immediately following fitting of the switch valve in the refrigeration circuit. Increased operational safety during fitting and/or commissioning is made possible thereby. Following an initial energisation of the actuating element, the switch valve is ready for operation.

Figure 2:
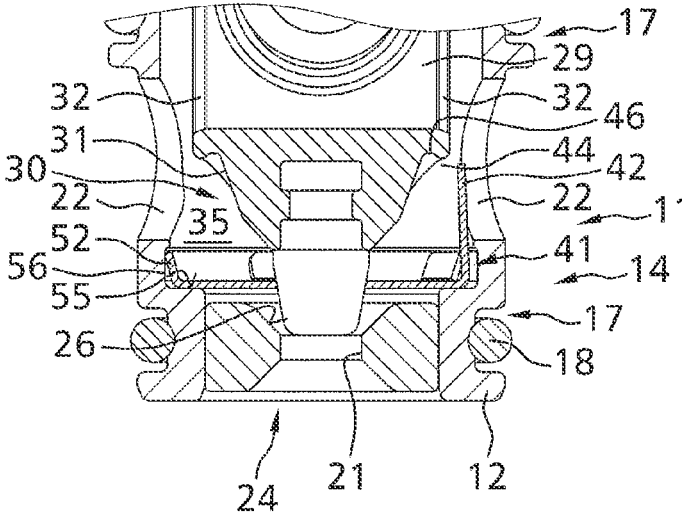
Figure 3:
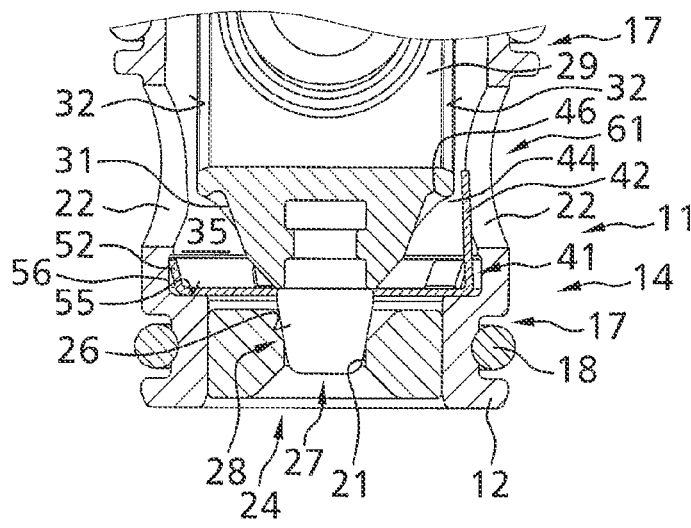
Figure 4:
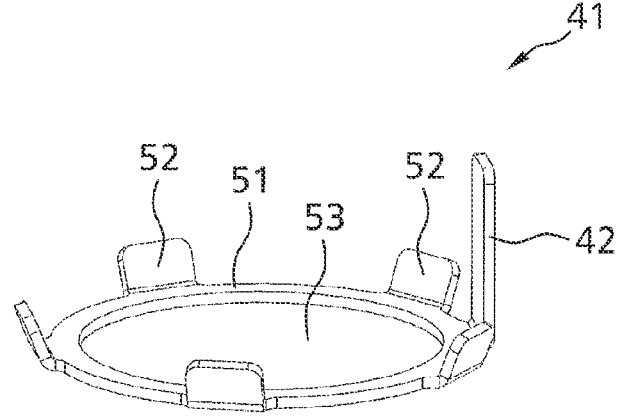
Figure 5:
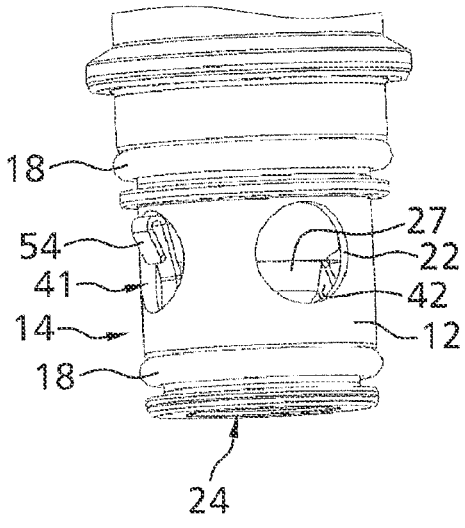
Figure 6:
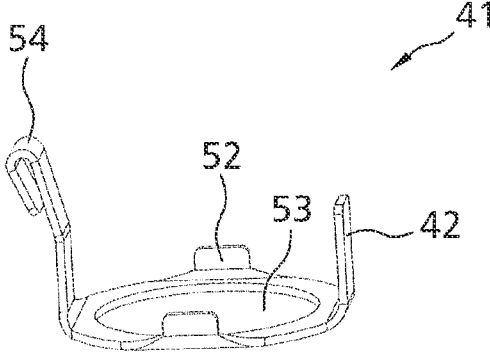
Figures 7, 8:
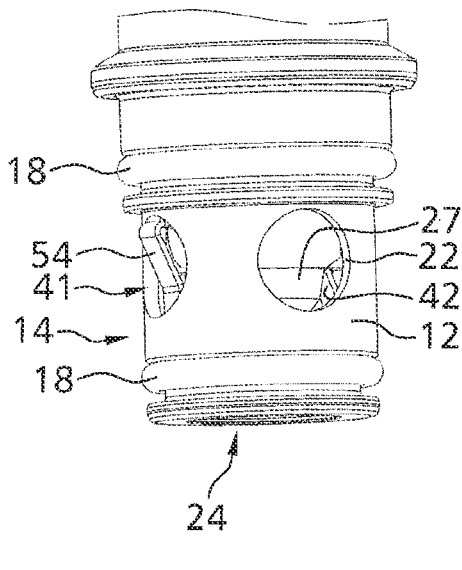
Figure 9:
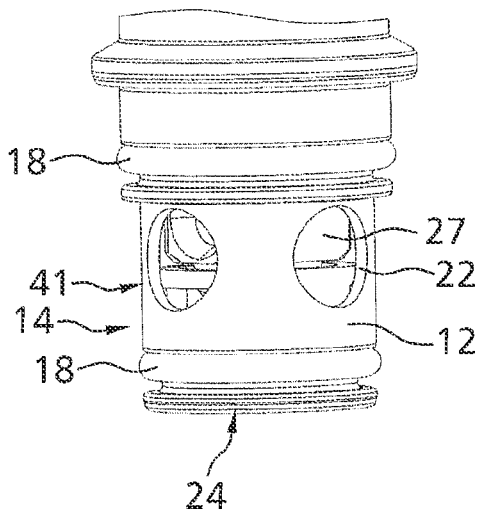
Figure 10:
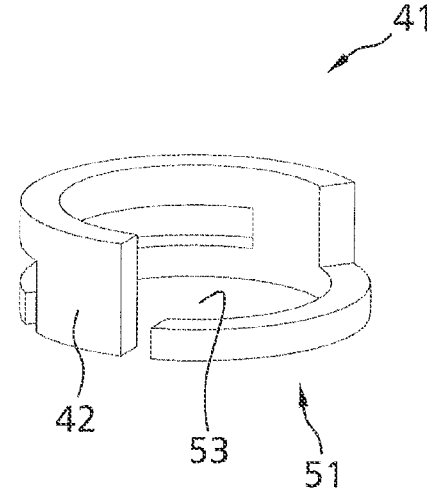
Figures 11, 12:
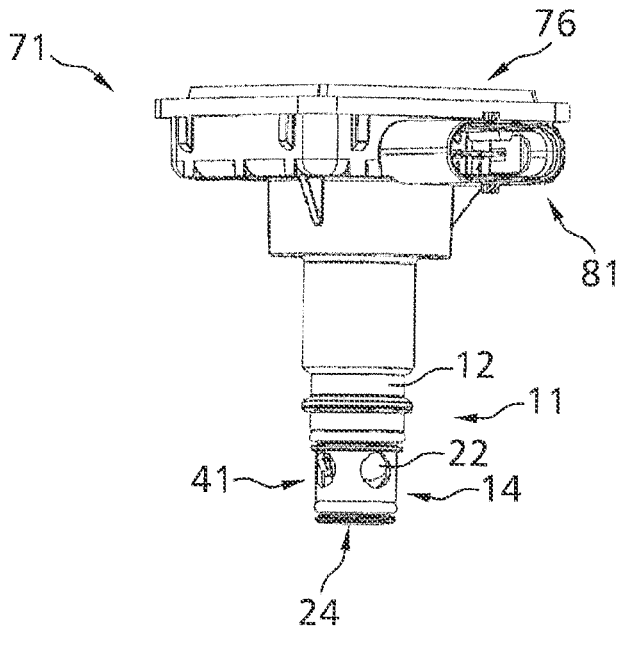
Figure 13:
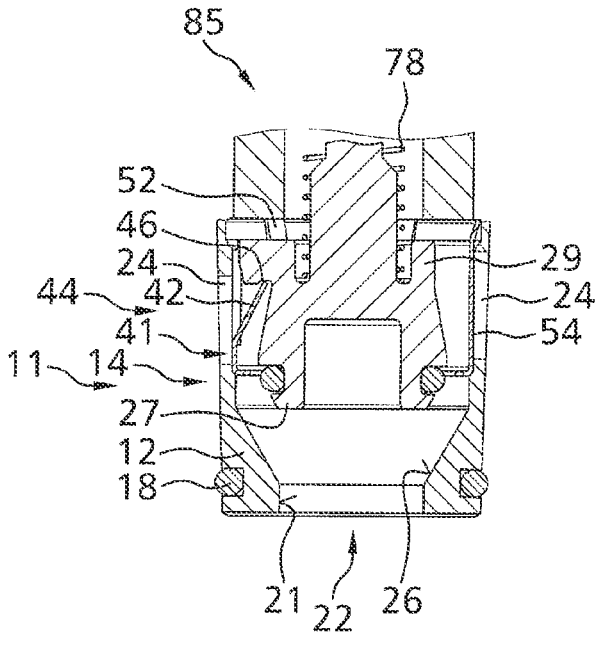

The invention and other advantageous embodiments and developments thereof are described and explained in greater detail below on the basis of the examples illustrated in the drawings. The features to be gathered from the description and the drawings can be applied according to the invention individually by themselves or in plural in any combination. Shown are in:

FIG. 1 a schematic sectional view of a valve in a filling position,

FIG. 2 a schematic sectional view of the valve according to FIG. 1 in an operating position, FIG. 3 a schematic sectional view of the valve according to FIG. 1 in a closed position, FIG. 4 a perspective view of a securing element for the filling position of the valve closing member in FIG. 1, FIG. 5 a schematic sectional view of the valve in a filling position with an alternative securing element to FIG. 4, FIG. 6 a perspective view of the securing element in FIG. 5, FIG. 7 a schematic sectional view of the valve in a filling position with an alternative securing element to FIG. 4, FIG. 8 a perspective view of the securing element in FIG. 7, FIG. 9 a schematic sectional view of the valve in a filling position with an alternative securing element to FIG. 4, FIG. 10 a perspective view of the securing element of FIG. 9, FIG. 11 a schematic side view of a switch valve with the valve according to FIG. 1, FIG. 12 a schematic sectional view of the switch valve according to FIG. 11, and FIG. 13 a schematic sectional view of a nonreturn valve.

FIG. 1 shows a schematic sectional view of a valve 11. This valve 11 comprises a housing 12, which has a connection point 14 for insertion into a connection device, such as e.g. a chiller, which is not shown in greater detail. The connection point 14 has at its upper and lower end respectively a circumferential groove 17 in which a seal 18 is provided in each case. Provided in the housing 12 is a passage opening 21, which connects a supply opening 22 to an outlet opening 24. In this exemplary embodiment according to FIG. 1, a plurality of supply openings 22 and only one outlet opening 24 are provided. The passage opening 21 is enclosed by a valve seat 26. A valve closing member 27 rests in a closed position 28 (FIG. 3) on the valve seat 26 and closes the passage opening 21. The valve closing member 27 is provided at one end of a valve body 29. From the valve closing member 27 a preferably conical section 31 extends to at least one guide section 32 on the valve body 29. The valve body 29 is guided by this guide section 32 in the housing 12, in particular of the connection point 14, so as to be movable up and down.

A regulating chamber 35 is formed in the housing 12. This regulating chamber 35 extends in particular between the at least one supply opening 22 and the passage opening 21. Arranged in the housing 12, in particular in the regulating chamber 35, is a securing element 41. The valve closing member 27 can be arranged in a filling position 44 by means of the securing element 41. This filling position 44 is illustrated in FIG. 1. In this filling position 44, the valve closing member 27 is lifted with respect to the valve seat 26, i.e., the passage opening 21 is open.

In FIG. 2, the valve 11 is arranged with a valve closing member 27 in an operating position 30. In the operating position 30, the valve closing member 27 is lifted from the valve seat 26 and unblocks the passage opening 21. The opening stroke of the valve closing member 27 from the closed position 28 according to FIG. 3 into the filling position 44 according to FIG. 1 is smaller than an opening stroke to transfer the valve closing member 27 to the operating position 30 according to FIG. 2.

The valve closing member 27 is arranged in the filling position 44 by a securing lug 42 of the securing element 41. In this case a free end of the securing lug 42 engages on an undercut 46 on the valve closing member 27. It is preferably provided that the undercut 46 is provided in a conical section 31 of the valve body 29. This undercut 46 is preferably provided circumferentially in the conical section 31 of the valve body 29.

FIG. 4 illustrates a perspective view of the securing element 41. This securing element 41 has an annular basic body 51. This annular basic body 51 is closed in this embodiment. The securing lug 42 is oriented in an angled manner on the outer circumference of the basic body 51. Furthermore, at least one latching element 52 is provided on the annular basic body 51. A plurality of such latching elements 52 are preferably configured, for example, as latching lugs. These are likewise angled in the same direction as the securing lug 42 with respect to the annular basic body 51. The latching elements 52 can be angled with respect to a planar extension of the basic body 51 in a range from 1° to 89°. The securing lug 42 is preferably angled by more than 90° relative to the basic body 51 under pretensioning in the filling position 44. A through opening 53 is provided inside the annular basic body 51.

The securing element 41 can be inserted into the connection point 14 of the housing 12. In particular, the securing element 41 is positioned in the regulating chamber 35. In the regulating chamber 35, a support face 55 is provided, which is provided radially outside of the passage opening 21 and the valve seat 26. Associated with the support face 55 is a circumferential recess 56 in the housing 12. Following insertion of the securing element 41 into the regulating chamber 35, the securing element 41 rests with the annular basic body 51 on the support face 55. The latching elements 52 engage in the recess 56. The securing element 41 is secured thereby in the installation position. In the installation position, the securing element 41 rests with the annular basic body 51 preferably on the support face 55. Regardless of a flow direction of the connection point 14, no flow losses occur on account of the large through opening 53 of the annular basic body 51.

The securing element 41 is preferably formed of metal. In particular, it is formed of spring steel. This securing element 41 can be manufacturable in a simple and low-cost manner as a bent stamped part.

When the securing element 41 is introduced into the regulating chamber 35, it is preferably provided that the securing lug 41 is oriented to the at least one supply opening 22. The securing lug 42 can be actuated thereby from outside with a tool to transfer said lug to the filling position 44, in which a face-side end of the securing lug 42 engages in the undercut 46 of the valve body 29, so that the securing element 42 is arranged secured in the undercut 46. The valve closing member 27 is pressed by a return element in the direction of the passage opening 21, whereby the latching of the securing lug 42 to the undercut 46 is maintained. The securing lug 42 is arranged under pretensioning with respect to the annular basic body 51 in the filling position 44.

The valve 11 is supplied in the filling position 44 and is fitted in a cooling circuit or heat circuit, which is not shown in greater detail. Following filling of the cooling circuit or heat circuit with a medium in a first commissioning, a first actuation of the valve closing member 27 takes place, so that this is transferable from the filling position 44 to the operating position 30. Here the valve closing member 27 is acted upon from the filling position 44 by a further stroke opposed to the valve seat 26. The securing lug 42 is released from the undercut 46 at the valve closing member 27 and valve body 29. The securing lug 42 assumes a disengaged position 61. This disengaged position 61 of the securing element 41 relative to the valve closing member 27 is depicted in FIG. 3. On account of the securing lug 42 being arranged under pretensioning in the filling position 44, this springs radially outwards. The valve closing member 27 can subsequently be actuatable, unobstructed by the securing element 41, between the closed position 28 illustrated in FIG. 1 and the operating position 30 illustrated in FIG. 2. The securing element 41 does not interfere in the operation of the refrigeration circuit.

FIG. 5 illustrates a schematic sectional view of the valve according to FIG. 1 with an alternative embodiment of the securing element 41. In FIG. 6, the alternative embodiment of the securing element 41 according to FIG. 5 is depicted in perspective. In this embodiment it is provided that the latching elements 52 are formed to be different from one another. This embodiment otherwise corresponds to FIG. 4. At least one of the latching elements 52 is configured as a latching lug in angled shape according to FIG. 4. At least one other latching element 52 is configured as a hook-shaped spring element. This hook-shaped spring element has an end that is angled radially outwards. This spring element can engage in a supply opening 22 and additionally secure the securing element 41 in the installation position in the regulating chamber 35.

FIG. 7 illustrates a sectional view of the valve according to FIG. 1 with an alternative embodiment of the securing element 41. FIG. 8 shows a perspective view of the alternative embodiment of the securing element 41 according to FIG. 7. In this embodiment it is provided, deviating from that in FIG. 6, that the at least one latching element 52 is configured as an L-shaped latching element with one end pointing radially to the through opening 53 of the annular basic body 51. This end of the securing lug 52 can engage in turn in the supply opening 22 and secure the securing element 41 in the installation position in the regulating chamber 35. The at least one latching element 54, which is provided for engaging on or in the supply opening 22, is oriented towards the securing lug 42 in such a way that the securing lug 42 is also associated with a supply opening 22 in the housing 12. This association also applies to the securing element 41 according to FIG. 6.

FIG. 9 illustrates a sectional view of the valve according to FIG. 1 with an alternative embodiment of the securing element. FIG. 10 shows the alternative embodiment of the securing element according to FIG. 9.

In this embodiment it is provided that the securing element 41 has an annular, open basic body 51. Provided on this basic body is the securing lug 42, wherein the securing lug 42 is held by a spring element configured in semi-circular shape. Arranged on the semi-circular spring element is the securing lug 42, which similar to the illustration in FIG. 1 engages on the undercut 46 of the valve body 29.

FIG. 11 illustrates a perspective view of a switch valve 71. FIG. 12 shows a schematic partial section of the switch valve 71 according to FIG. 11. The connection point 14 is provided on an underside of the switch valve 71. This connection point 14 can be inserted into a connection device, not depicted in greater detail, and can be positionable in a passage between an inlet opening and an outlet opening of the connection device. The passage between a closed position and an open position is actuated by the valve 11 of the switch valve 71. This connection device can be what is called a chiller, for example. The switch valve 71 positioned with the connection point 14 in the connection device can be fixed detachably by clamping, screwing, a plug connection or similar.

A drive 76 is provided on the housing 12 of the valve 11. The drive 76 is supplied with energy, preferably from an on-board electrical system, by way of a plug-in connection 81. This drive 76 comprises at least one actuating element 77 made of a shape memory alloy and at least one return element 78, which counteracts an actuating movement of the actuating element 77. The valve closing member 27 can be arranged in the closed position 28 by the return element 78. The drive 76 further comprises connections 79 for energising the actuating element 77. If the actuating element 77 is energised, the valve closing member 27 is transferred from the closed position 28 to the operating position 30. If the drive 76 is not actuated and the actuating element 77 is not energised, the valve closing member 27 is transferred by the return element 78 to the closed position 28.

The drive 76 can alternatively also be provided as a solenoid drive or as a stepper motor or an otherwise electrically driven motor for actuating an actuating movement of the valve closing member 27.

FIG. 13 illustrates a schematic sectional view of a non-return valve 85 with a valve 11. The valve 11 is arranged by the securing element 41 in a filling position 44. In this filling position 44, the valve closing member 27 is lifted with respect to the valve seat 26. The valve 11 is open. In this open position of the valve 11, filling of the refrigeration circuit can take place through the outlet opening 24 or the supply opening 22. To transfer the valve 11 from the filling position 44 to a closed position 28, as shown in FIG. 3, for example, the refrigerant is supplied to the refrigeration circuit at a pressure by way of the supply opening 22 to the valve 11, so that the valve closing member 27 is transferable to the operating position 30 according to FIG. 2. The securing element 41 moves here from the catch position depicted in FIG. 13 to a disengaged position 61. The securing lug 42 is released from the undercut 46. The valve closing member 27 is subsequently transferred to the closed position 28 corresponding to that in FIG. 3 on account of a return element 78. The nonreturn valve 85 is thus in a starting position. In this starting position a passage between the supply opening 22 and the outlet opening 24 is closed. In the event of an operating pressure existing at the supply opening 22, the valve closing member 27 can lift with respect to the valve seat 26. A passage between the supply opening 22 and outlet opening 24 is unblocked.

The invention claimed is:

1. Valve, with a housing, which comprises a connection point for insertion into a connection device, wherein the connection point comprises a passage opening, which connects at least one supply opening and at least one outlet opening, with a valve seat, which is associated with the passage opening and which can be closed by a valve closing member, with a regulating chamber in the connection point, which chamber is formed between the supply opening and the passage opening or between the passage opening and the outlet opening, wherein the valve closing member is arranged in a closed position and closes the valve seat and is transferable by a drive or a pressure of a medium to an operating position in which the valve closing member is lifted with respect to the valve seat and unblocks the passage opening, wherein a securing element is provided, which holds the valve closing member in a filling position relative to the valve seat, in which position the valve closing member is lifted with respect to the valve seat and unblocks the passage opening, and the securing element is transferable, following the first transfer of the valve closing member from the filling position to the operating position, to a disengaged position relative to the valve closing member and subsequently the valve closing member is transferable to the closed position, and wherein the securing element has a securing lug or a securing pin, which is arranged under pretensioning in the filling position relative to the valve closing member, and wherein the securing element has an annular basic body, which is open or closed and the securing lug or the securing pin is angled with respect to a planar extension of the annular basic body.

2. Valve according to claim 1, wherein an opening stroke of the valve closing member into the filling position is smaller than an opening stroke of the valve closing member into the operating position.

3. Valve according to claim 1, wherein the securing element is provided in the regulating chamber.

4. Valve according to claim 1, wherein between the securing element and the valve closing member is provided a releasable latch or clamp connection, which is transferable from the filling position autonomously to the disengaged position.

5. Valve according to claim 1, wherein between the securing element and the valve closing member is provided a releasable latch or clamp connection, which engages on an undercut provided on the valve closing member and is secured in the filling position.

6. Valve according to claim 1, wherein the securing lug or the securing pin is angled with respect to a planar extension of the annular basic body in a range between 60° and 120°.

7. Valve according to claim 1, wherein the annular body has at least one latching element, which acts on or engages in the connection point and secures the securing element in an installation position relative to the connection point.

8. Valve according to claim 7, wherein the at least one latching element is configured as a latching lug projecting radially outwards on the basic body, which lug engages in a recess in the housing and secures the securing element in the installation position in the regulating chamber.

9. Valve according to claim 7, wherein provided on the annular basic body is at least one latching element, which acts or engages on and in a supply opening or outlet opening of the housing.

10. Valve according to claim 1, wherein a through opening of the annular basic body of the securing element aligns with the passage opening in the housing and the annular basic body is associated externally circumferentially with the valve seat.

11. Valve according to claim 1, wherein the securing lug or the securing pin of the securing element is arranged in the regulating chamber oriented to a supply opening or an outlet opening.

12. Valve according to claim 1, wherein the securing element is formed from a metal or from plastic or from a composite component of metal and plastic.

13. Valve according to claim 12, wherein the metal securing element is configured as a bent-stamped part, or that the securing element consisting of plastic is configured as an injection-moulded part.

14. Valve according to claim 1, wherein the valve is configured as a nonreturn valve, in which the valve closing member is arranged in the closed position by a return element.

15. Valve according to claim 1, wherein the valve is a switch valve, on which the drive is provided on or in the housing, by which drive the valve closing member is actuable for opening and closing the passage opening, the drive comprises an actuating element made from a shape memory alloy, by which the valve closing member is transferable from the closed position upon actuation of the drive to an operating position in which the valve closing member is lifted with respect to the valve seat, and the drive comprises a return element, which counteracts the actuating movement of the actuating element and transfers the valve closing member to the closed position relative to the valve seat and holds the valve closing member in the closed position in the event of non-actuation of the drive.

16. Valve according to claim 1, wherein the valve is provided for controlling a medium in a cooling circuit or heat circuit.

17. Valve, with a housing, which comprises a connection point for insertion into a connection device, wherein the connection point comprises a passage opening, which connects at least one supply opening and at least one outlet opening, with a valve seat, which is associated with the passage opening and which can be closed by a valve closing member, with a regulating chamber in the connection point, which chamber is formed between the supply opening and the passage opening or between the passage opening and the outlet opening, wherein the valve closing member is arranged in a closed position and closes the valve seat and is transferable by a drive or a pressure of a medium to an operating position in which the valve closing member is lifted with respect to the valve seat and unblocks the passage opening, wherein a securing element is provided, which holds the valve closing member in a filling position relative to the valve seat, in which position the valve closing member is lifted with respect to the valve seat and unblocks the passage opening, and wherein the securing element is transferable, following the first transfer of the valve closing member from the filling position to the operating position, to a disengaged position relative to the valve closing member and subsequently the valve closing member is transferable to the closed position, and wherein the securing element has a securing lug or a securing pin, which is arranged under pretensioning in the filling position relative to the valve closing member, and wherein between the securing element and the valve closing member is provided a releasable latch or clamp connection, which is transferable by a pivot movement or rotary movement or by a radial movement outwards with respect to a longitudinal axis of the valve closing member into the disengaged position.

* * * * *